No. 781,870.                                              Patented February 7, 1905.

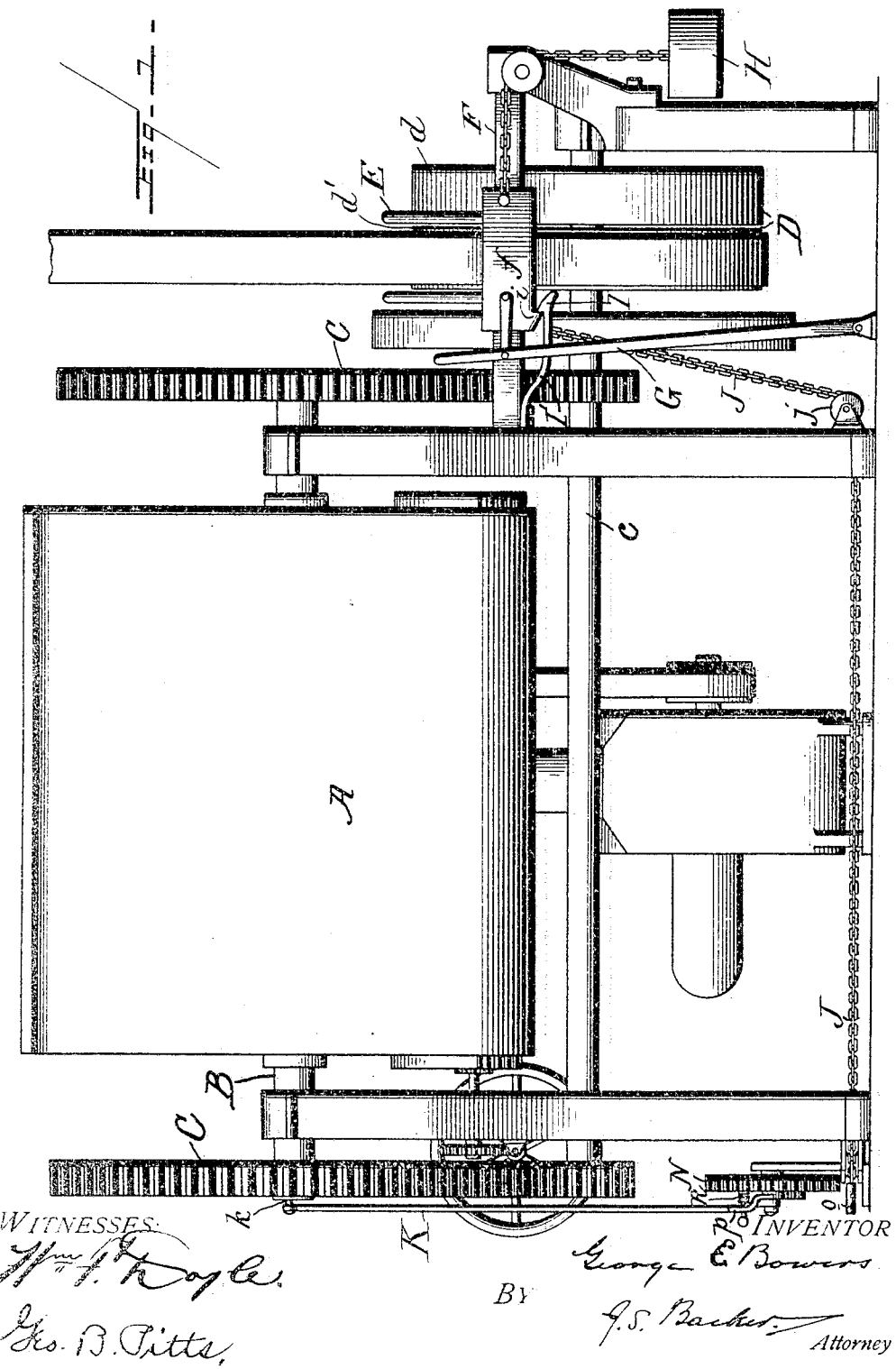

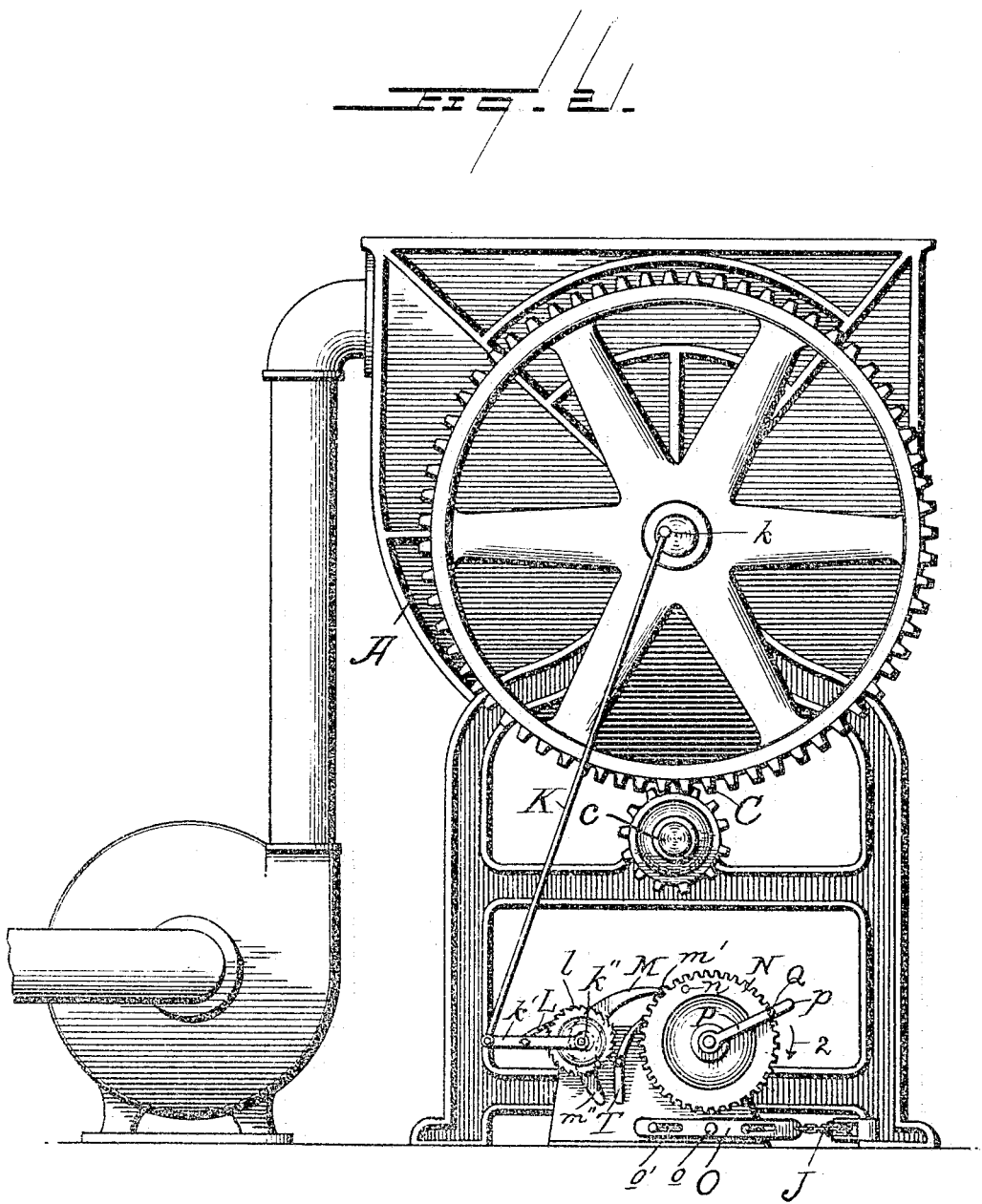

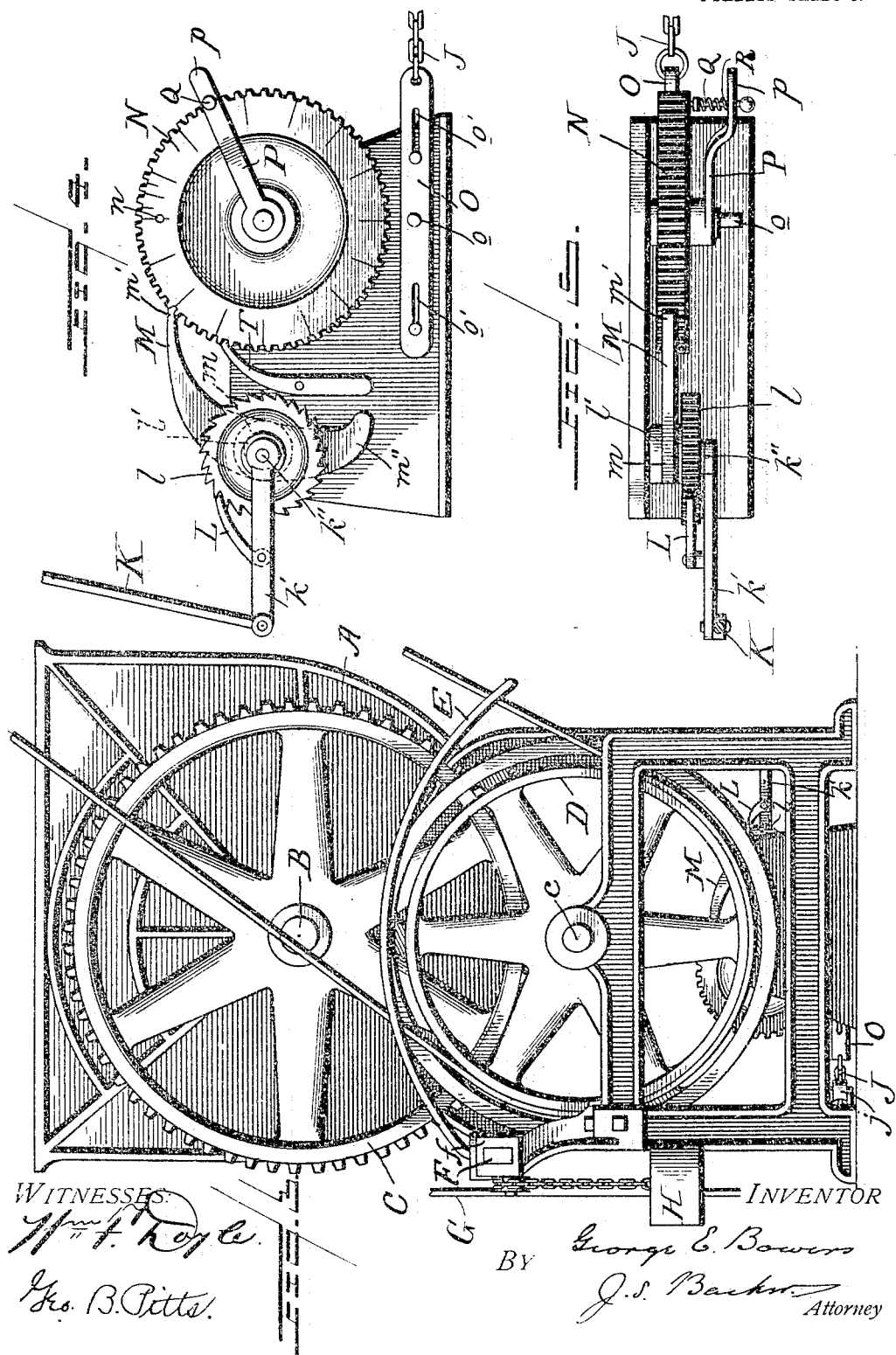

UNITED STATES PATENT OFFICE.

GEORGE E. BOWERS, OF WASHINGTON, DISTRICT OF COLUMBIA, ASSIGNOR OF TWO-THIRDS TO WILLIAM S. CORBY AND CHARLES I. CORBY, OF WASHINGTON, DISTRICT OF COLUMBIA.

AUTOMATIC STOPPING MECHANISM.

SPECIFICATION forming part of Letters Patent No. 781,870, dated February 7, 1905.

Application filed November 25, 1903. Serial No. 182,609.

*To all whom it may concern:*

Be it known that I, GEORGE E. BOWERS, a citizen of the United States, residing at Washington, in the District of Columbia, have invented certain new and useful Improvements in Automatic Stopping Mechanism, of which the following is a specification.

In many classes of machinery it is desirable that the apparatus should be stopped after it has run a certain length of time or has made a certain number of revolutions. For instance, in certain types of dough-mixing machines the mixing or beating arms should perform a certain number of revolutions for making a dough of one character, while for dough of a different nature the number of revolutions of the beater should be different.

My invention has for its object to produce an automatically-operating adjustable controlling device by means of which the machine may be stopped after it has run a long or short period, accordingly as it is set, thus making it entirely unnecessary for the attendant to give attention to the apparatus after it is once started.

I have shown the invention applied to a dough-mixing machine of the Corby type, in which a revolving beater mounted within the mixing tank or vessel is run at a high rate of speed for a considerable period of time; but it is evident that my invention is not limited to its combination with machines of any particular character or with power-cut-off means of a particular kind, as it is adapted for a very wide range of use.

In the accompanying drawings, Figure 1 is an end view of my invention applied to a dough-mixing machine. Fig. 2 is a bottom plan view. Fig. 3 is a side view. Fig. 4 is a side view of the controlling mechanism drawn to a larger scale than are Figs. 1, 2, and 3. Fig. 5 is a top plan view of the parts shown in Fig. 4.

In the drawings, A designates the tank of a dough-mixing machine, in which is mounted a revolving beater or set of mixing-arms. These are mounted upon the shaft B, which is driven by suitable gearing C. Upon the driving-shaft $c$ are mounted the fast and loose pulleys D, belted to any suitable motor.

The form of power-cut-off device which I have chosen for the purpose of illustrating my invention is a belt-shifter, which may be of any desired or approved form, that shown in its main features being of a well-known construction and comprising a fork E, that engages with the belt, a sleeve $f$, with which the fork is connected, mounted to slide freely upon a shaft F, which is supported in suitable bearings, and a hand-lever G, connected with the sleeve $f$. I prefer to combine with this belt-shifter a weight H, connected with the sleeve $f$ and tending to move the parts into position with the belt upon the loose pulley $d$. The sleeve $f$ is provided with a projection $i$, with which engages a catch I when the belt has been shifted into engagement with the fast pulley $d'$, the parts being thus held to drive the shaft B so long as the catch remains in engagement with the projection $i$. In order to trip the catch and allow the weight to automatically shift the belt over onto the loose pulley, I connect with the catch a chain J or equivalent means for operating the catch. My invention in the embodiment thereof herein illustrated has particularly for its purpose to operate the catch I at the moment it is desired to stop the machine, and I will now proceed to describe the parts by which this object is attained.

K designates a rod having at one end an eccentric connection $k$ with the shaft B and its opposite end connected with a crank-arm $k'$, mounted on a rock-shaft $k''$. Upon the shaft $k''$ there is mounted a ratchet-wheel $l$ and an eccentric $l'$. The crank-arm $k'$ is preferably loose upon the shaft $k''$, while the ratchet-wheel and eccentric are fast thereto. L is a pawl carried by the crank-arm $k'$ and arranged to engage with the teeth of the ratchet-wheel $l$. The rod $k$ is preferably so connected as to cause the wheel $l$ to be advanced by the pawl L the distance of one tooth at each revolution of the shaft B.

M is a pawl provided with a loop or yoke $m$, encircling the eccentric $l'$ and arranged to have its free or toe end $m'$ engage with the teeth of a gear-wheel N. The latter is provided with a large number of teeth in order to give to the device a wide range of adjustability, as will be hereinafter described. It will be apparent that the pawl M will advance the wheel N one step at each revolution of the shaft $k''$ and that this movement will represent a number of revolutions of the shaft B, corresponding with the number of teeth upon the ratchet-wheel $l$.

The chain or cord J, that is connected with the catch I of the belt-shifter, is guided by suitable pulleys $j$ to a sliding plate O, arranged near the wheel N, with which plate the chain is connected. This plate is provided with a stud or projection $o$, with which a projection $p$, carried by the wheel N, is adapted to engage. The plate O is allowed a limited movement, being slotted, as at $o'$, and secured to a suitable support by bolts passing through such slots. The plate is normally held at one extreme of its movement by the spring I' of the catch I, which acts upon the plate through the connection J. It will now be apparent that if the wheel N be moved in the direction of the arrow 2, Fig. 1, and the projection $p$, carried thereby, come into engagement with the projection $o$ of the sliding plate the latter will be moved and the catch I withdrawn from engagement with the lug or projection $i$, allowing the weight H to shift the belt onto the pulley $d$, thus cutting off the driving power from the machine. I prefer that the projection $p$ should be adjustable angularly about the wheel N, so that if the wheel be brought to an initial or starting position, which may be indicated by bringing a suitable mark $n$ on the wheel opposite the stud $o$, the wheel will be given more or less movement before the plate O is tripped, accordingly as the projection $p$ is set. For adjustably supporting and connecting the projection $p$ with the wheel I prefer the following arrangement: P indicates an arm loosely mounted upon the shaft of the wheel N, the outer or free end of which arm constitutes the projection $p$. In order to rigidly connect the arm P with the wheel, I mount in the outer end of the arm a sliding pin Q, the inner end of which is adapted to enter between the teeth of the wheel N. A spring R is connected with the pin Q and tends to force it inward, so as to enter between the teeth of the wheel. The outer end of the pin Q is formed into a head or handle by which the pin and arm P may be manipulated. The teeth of the wheel N may be marked with numbers to indicate the number of revolutions of the shaft B that will be given before the power is cut off the machine when the pin Q is made to engage the particular tooth bearing the desired number, and the wheel is set to an initial position.

T designates a dog adapted to engage with the teeth of the wheel N and prevent backward movement thereof. The wheel is preferably mounted to turn freely in either direction upon its shaft when free from the pawl M and dog T. As the wheel should always be set at its initial position when the teeth are numbered, as described, before the machine is started, I have provided the pawl M with a heel or rearward extension $m''$, that is adapted to engage with the dog T and throw it out of engagement with the wheel whenever the pawl is lifted from engagement with the wheel.

The operation of the machine will be understood and may now be described. If it be supposed that the ratchet-wheel $l$ is provided with twenty-five teeth and the wheel N with ninety teeth, it is evident that the machine may be automatically stopped after it has performed twenty-five revolutions or any multiple thereof up to two thousand two hundred and fifty, accordingly as the projection $p$ is set with reference to the starting-point of the wheel. If it be set one tooth behind the mark $n$ or starting-point, the plate O will be shifted and the belt thrown onto the loose pulley after the wheel $l$ has made one complete revolution, this indicating twenty-five revolutions of the shaft B. By counting the teeth, beginning with the mark $n$ or starting-point and going backward and multiplying this number by twenty-five, I am enabled to determine the exact number of revolutions of the shaft B that will have been made when the belt is shifted; but these calculations are made and are indicated by the marks on the side of the wheel N if the point indicated by the mark $n$ be always observed as the starting-point of the wheel.

In many kinds of machines—for instance, in a dough-mixing machine like that illustrated in the drawings of this case—it is desirable to arrange the adjustable step-by-step mechanism for operating the cut-off on the opposite side of the machine from the belt-shifter or other cut-off employed, as the construction of the machine facilitates this arrangement. It therefore becomes necessary to carry the connecting means between the step-by-step operating device and the power cut-off across the machine. By employing a flexible connection, as the cord or chain J, I am enabled to locate this connection in an out-of-the-way and sheltered position—as, for instance, under the machine and close to the floor. Likewise by employing the rod K, I am enabled to connect the step-by-step controlling mechanism by a simple means and directly with the rotating part whose revolutions are to be numbered and serve to control the operation of the cut-off, and this connection also enables me to mount the controlling mechanism in a position where it will be sheltered and out of the way of the attendants who may operate the machine.

I have chosen a belt-shifter to illustrate one well-known form of mechanism for cutting off the power of the apparatus. If electricity were employed, a controller would be used in lieu of the belt-shifter. I therefore desire to be understood as using a belt-shifter in this case in a generic sense to include other well-known and equivalent forms of apparatus for cutting off the power from the machine or apparatus being driven.

Having described my invention, what I claim, and desire to secure by Letters Patent, is—

1. The combination with a power-driven machine, and means for cutting off the power from such machine, of a controlling device for the power-cut-off means, arranged to be operated by the power-driven machine, and comprising a toothed wheel and an operating contact projection connected with the wheel and adjustable angularly relative thereto, and operating connections between the controlling and cut-off means arranged to be operated by the said contact, substantially as set forth.

2. The combination with a power-driven machine, and means for cutting off the power therefrom, of a controlling mechanism comprising a toothed wheel arranged to be driven from the said machine, an arm carrying a contact part mounted on the shaft of the wheel and adjustable relative to the wheel around said shaft, and means for uniting the arm to the wheel in the different positions to which it may be adjusted, and means for operating the cut-off mechanism arranged to be operated by the said contact of the controlling mechanism, substantially as set forth.

3. The combination with a power-driven machine, and means for cutting off the power therefrom, of a controlling mechanism comprising a wheel, an adjustable contact, speed-reducing means for operating the said wheel arranged to be driven from the said machine, and connections with the stop mechanism arranged to be operated by the said contact-wheel, substantially as set forth.

4. The combination with a power-driven machine having a rotating shaft B, and a stop mechanism therefor, of a step-by-step controlling mechanism for the stop mechanism, and a connecting-rod K between the shaft B of the machine and the controlling mechanism, substantially as set forth.

5. The combination with a power-driven machine, and a stop mechanism therefor, of a step-by-step controlling device operated by the machine having a contact projection, a sliding plate arranged to be operated by the said contact projection, and connections between the said sliding plate and the stop mechanism, substantially as set forth.

6. In a controlling device for stop mechanisms, the combination of a toothed wheel loose upon its shaft, a contact projection carried by the wheel, a pawl for operating the wheel, a dog for preventing backward movement of the wheel, means whereby when the pawl is lifted from engagement with the wheel the dog is thrown out of engagement with the wheel, thus leaving the latter free to be turned upon its shaft, and stop mechanism arranged to be operated by the said contact projection, substantially as set forth.

7. In a controlling device for stop mechanisms, the combination of a pawl and ratchet-wheel to which a step-by-step movement is imparted, an eccentric operated by the ratchet-wheel, a pawl operated by the said eccentric, another wheel with which the pawl engages, a contact projection carried by the last said wheel, and stop mechanism arranged to be operated by the said contact projection, substantially as set forth.

8. In a controlling device for stop mechanisms, the combination of a wheel provided with an adjustable contact projection, a dog T for holding the wheel against backward movement, a pawl M for operating the wheel provided with an extension $m''$ arranged to lift the dog T when the pawl is disengaged from the wheel, and stop mechanism arranged to be operated by the said contact projection, substantially as set forth.

GEORGE E. BOWERS.

Witnesses:
J. S. BARKER,
ALBERT HARPER.